United States Patent
Susko et al.

[11] Patent Number: 5,362,131
[45] Date of Patent: Nov. 8, 1994

[54] PROTECTIVE COVER FOR A HINGE JOINT

[75] Inventors: Thomas Susko, East Point; Douglas Moore, Grand Rapids, both of Mich.

[73] Assignee: Lear Seating Corporation, Southfield, Mich.

[21] Appl. No.: 35,789

[22] Filed: Mar. 23, 1993

[51] Int. Cl.⁵ ............................................. B60N 2/00
[52] U.S. Cl. ............................... 297/463; 297/452.38; 16/250
[58] Field of Search ............... 297/463, 452.38, 219.1, 297/113; 16/250, 251

[56] References Cited

U.S. PATENT DOCUMENTS

| | | | |
|---|---|---|---|
| 1,065,807 | 6/1913 | Hope | 16/250 |
| 2,586,757 | 2/1952 | Wummel | 16/250 |
| 2,995,785 | 8/1961 | Hallenbeck | 16/250 |
| 3,005,227 | 10/1961 | Horvay | 16/251 |
| 3,319,697 | 5/1967 | Krohn | 16/250 |
| 3,893,269 | 7/1975 | Nelsson | 16/250 |
| 4,311,338 | 1/1982 | Moorhouse | 297/411 |
| 4,319,382 | 3/1982 | Zernig | 16/251 |
| 4,759,583 | 7/1988 | Schrom et al. | 297/113 |
| 4,882,807 | 11/1989 | Frye et al. | 16/225 |

FOREIGN PATENT DOCUMENTS

| | | | |
|---|---|---|---|
| 2550927 | 3/1985 | France | 16/250 |
| 2753522 | 6/1979 | Germany | 16/251 |
| 3120892 | 12/1982 | Germany | 297/463 |
| 0116233 | 7/1983 | Japan | 297/463 |
| 0076432 | 4/1985 | Japan | 297/219.1 |

*Primary Examiner*—Kenneth J. Dorner
*Assistant Examiner*—David E. Allred
*Attorney, Agent, or Firm*—Reising, Ethington, Barnard Perry & Milton

[57] ABSTRACT

A seating assembly (10) including a hinge joint (30) rotatably connecting an articulated member (21) to a support member (28). The hinge joint (30) includes a cover (26) having a face plate (32) positioned adjacent to the hinge joint (30) for preventing ingress of foreign materials into the joint from an axial direction. The cover (26) further includes flexible strips (34, 34') extending circumferencially about the hinge joint (30). Channels (56, 56') are attached to the articulated member (21) at a location adjacent the hinge joint (30) and slidably receive and guide the strips (34, 34') circumferencially about the hinge joint (30) to prevent ingress of foreign materials into the hinge joint (30) from a radial direction.

8 Claims, 3 Drawing Sheets

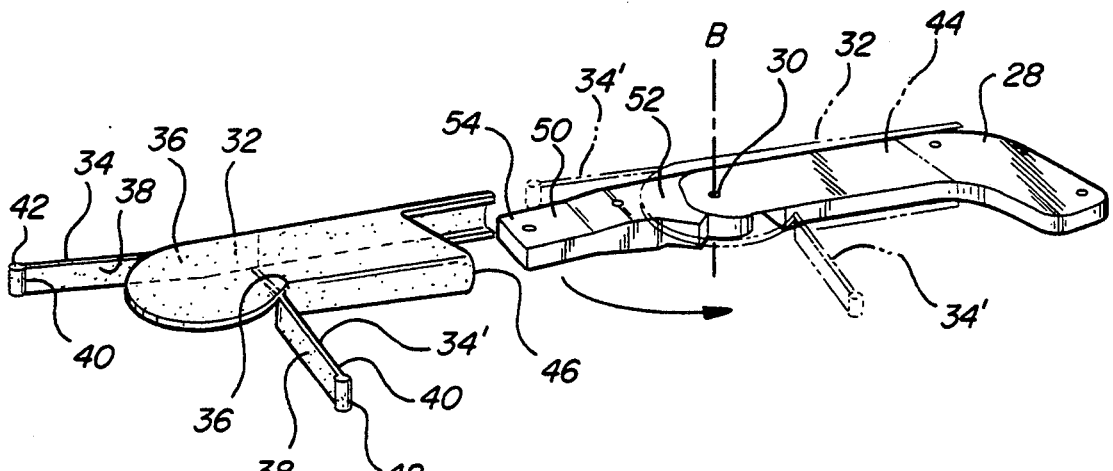
FIG-3
FIG-4
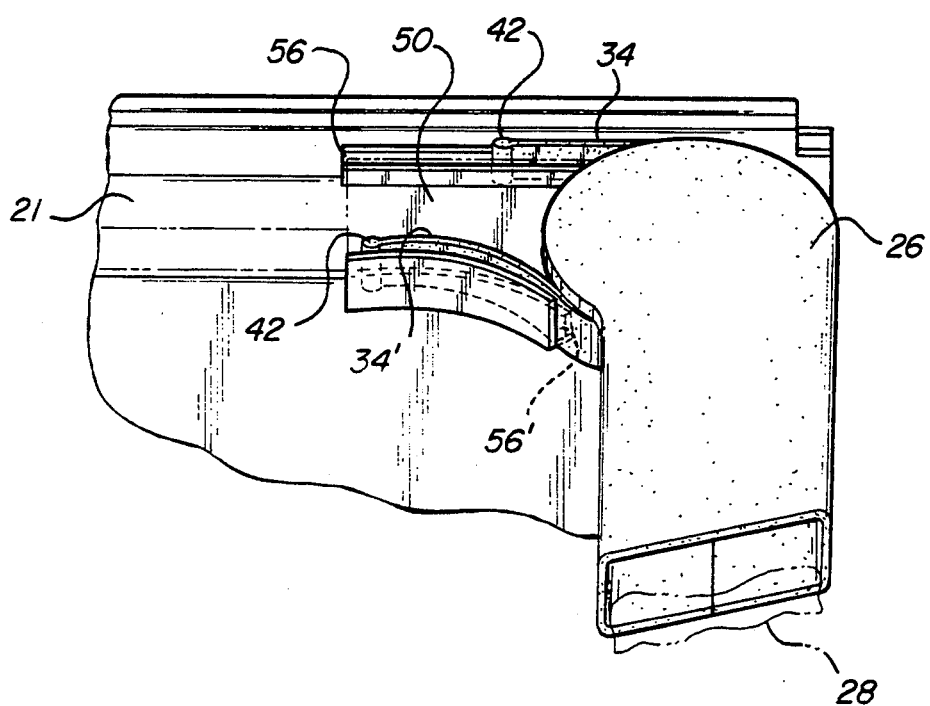

PROTECTIVE COVER FOR A HINGE JOINT

BACKGROUND OF THE INVENTION

1. Technical Field

The present invention relates to a cover for protecting a hinge joint of an armrest or seat assembly. The cover includes a face plate and flexible strips extending circumferencially about the joint for preventing ingress of foreign materials into the joint.

2. Description of the Related Art

Armrest and seat assemblies often use hinge joints for permitting an armrest unit or seat back to move about an arcuate path. Such joints are typically located at a position between the horizontal portion of a seat and the upright or backrest portion. Due to their location, such joints are exposed to foreign debris such as dirt, moisture, clothing, etc.

As a protective measure, hinge joints used in vehicular seats and armrest assemblies often include protective covers. Such covers are often made from decorative plastic which not only protects the hinge joint from ingress of foreign material, but also provides a decorative exterior covering for the hinge.

An example of such a cover is shown in U.S. Pat. No. 4,311,338 to Moorhouse which discloses an armrest hinge including a protective cover. The hinge interconnects a pivot arm with a rigid support member so that pivot arm may rotate about a pivot axis of the hinge. A hinge cover is secured to the pivot arm and extends over the sides of the hinge. That is, the cover protects the planar sides of the hinge. Unfortunately, as the pivot arm is rotated, the circumference of the hinge joint is exposed. In other words, the cover must provide channels or gaps therein for the pivot arm to move relative to the support member. Consequently, foreign material such as dirt and moisture are permitted to enter the hinge joint radially, about its circumference, thereby compromising hinge performance.

An additional example of such a cover is shown in U.S. Pat. No. 4,759,583 to Schrom et al. which discloses an armrest assembly including an armrest cushion having pivot pins extending from each side and defining a pivot axis. The pivot pins fit within a hooked shaped member which permits the armrest cushion to rotate about the pivot axis. A cover is provided over the joint formed by the pivot pins and hooked shaped member. However, to permit the armrest cushion to rotate about the pivot axis, the cover does not extend into the plane of rotation of the armrest cushion. That is, portions of the pivot pins must remain unprotected by the cover in order to permit the armrest cushion to rotate about the pivot axis. Thus, the circumference of the hinge joint is exposed to ingress of foreign debris.

SUMMARY OF THE INVENTION AND ADVANTAGES

The present invention is a cover for protecting a hinge joint of an assembly wherein the assembly includes a hinge joint rotatably connecting an articulated member to a support member for permitting the articulated member to rotate about a pivot axis relative to the support member. The cover includes a face plate for preventing ingress of foreign material into the hinge joint from an axial direction. The cover is characterized by including at least one flexible strip extending from the cover to a distal end spaced from the face plate. The flexible strip is for reciprocating movement circumferencially about the hinge joint as the articulated member is rotated, thereby prevent ingress of foreign material into the hinge joint from a radial direction.

Thus, the present invention provides an improved hinge cover which not only prevents ingress of foreign material into the hinge joint from an axial direction, but also from a radial direction, about the circumference of the hinge joint.

BRIEF DESCRIPTION OF DRAWINGS

Other advantages of the subject invention will be readily appreciated as the same becomes better understood by reference to the following detailed description when considered in connection with the accompanying drawings wherein:

FIG. 3 is a perspective view showing the hinge cover installed upon a hinge joint;

FIG. 4 is a fragmentary perspective view showing the subject cover installed upon a hinge joint with the strips disposed within the channels;

DETAILED DESCRIPTION OF THE PREFERRED EMBODIMENT

Figure 1:
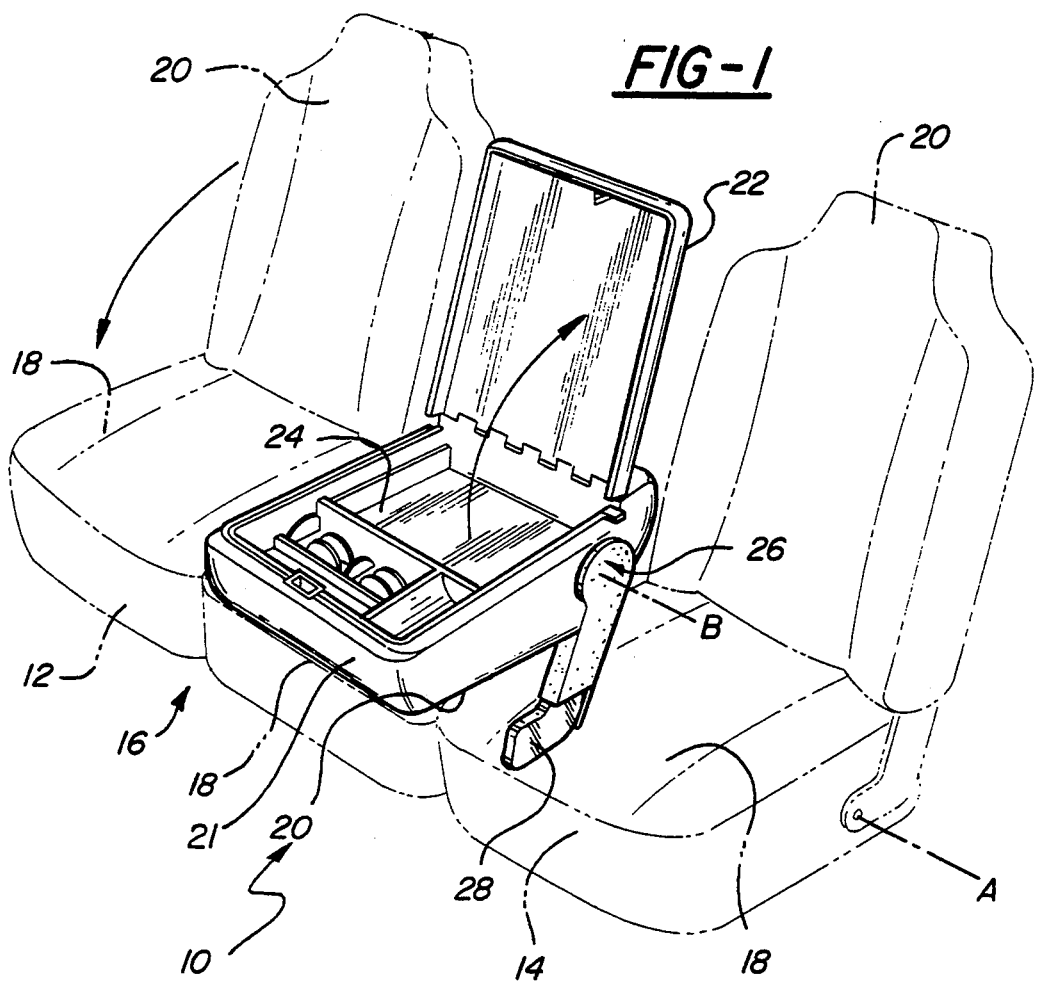
FIG. 1 is a perspective view of the subject hinge cover shown installed upon a hinge joint of an armrest assembly positioned within a vehicle seat assembly, which is shown in phantom.

The present invention is a hinge cover for protecting a hinge joint of the type used in vehicular seating assemblies. Referring now to the drawings wherein like numerals indicate like or corresponding parts throughout the several views, a typical seating assembly is generally shown at 10 in FIG. 1. The seating assembly 10 includes two outer seat units 12,14 (shown in phantom) along with a middle unit, generally shown at 16. The seat units 12,14 each include a horizontal or "seat" portion 18 (shown in phantom) and an rotatable vertical or "backrest" portion 20. The backrest portions 20 are secured to the seat portions 16 of the seat assemblies 12,14 by way of hinge joints which permit the backrest portions 20 to be rotated about a rotation axis A.

The middle unit 16 includes a rotatable articulated member 21. The articulated member 21 may simply comprise a seat backrest assembly, as that shown at 20 with reference to the seat assemblies 12,14. Alternatively, the articulated member 21 may simply comprise an armrest assembly (not shown). For illustrative purposes, the middle unit 16 is shown as a combination armrest/seat assembly including a horizontal or "seat" portion 18 (shown in phantom). The articulated member 21 of the assembly includes a backrest portion 20 on its front side and an armrest portion 22 on its rear side. When the articulated member 21 is in a declined position, as shown in FIG. 1, the backrest portion 20 rest against the seat portion 18 and the armrest portion 22 on the rear side of the articulated member 21 is in position for use. The articulated member 21 is rotatable to an inclined position (not shown but indicated by an arrow). In the inclined position, the seat backrest portion 20 forms an approximately 90 degree angle with the seat portion 18 and thus forms a seat unit substantially similar to the outer seat units 12,14.

The armrest portion 22 may include a storage compartment 24 for storing change, cassette taps, maps, and the like.

The subject hinge cover is indicated at 26 and is shown disposed over a hinge joint (hidden by cover 26). The hinge joint connects the articulated member 21 to a support member 28, thereby permitting the articulated member 21 to rotate about an axis, B. The support member 28 is in turn mounted to a floor board or other rigid member (not shown).

Figure 2:
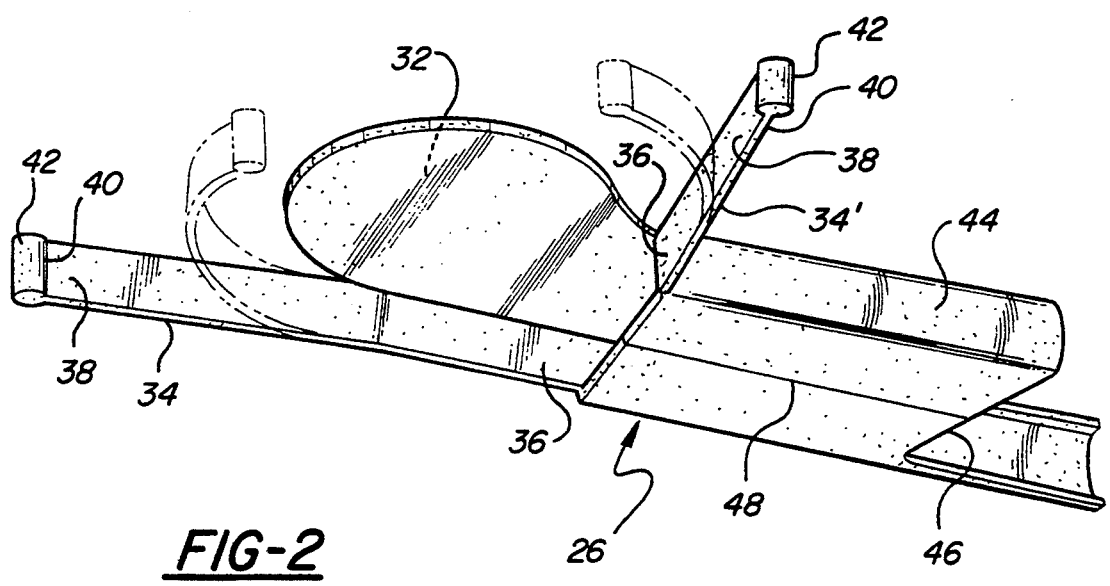
FIG. 2 is a perspective view of the hinge cover illustrating the flexibility of the strips.

With reference to FIG. 2, the subject cover is generally shown at 26. The cover 26 includes a generally circular shaped face plate 32 having two, generally rectangular shaped, flexible strips 34,34' extending approximately tangentially therefrom. The strips 34, 34' include a first end 36 secured to the face plate 32 and a body portion 38 extending from the first end 36 to a distal end 40. The flexible strips 34, 34' extend longitudinally from the first end 36 secured to the cover 26 to the distal end 40 spaced from the cover 26. A bulbous portion 42 is disposed at the distal end 40 of the strips 34,34', the function of which will be described in more detail in the succeeding description. The cover 26 further includes a support plate 44 secured to the face plate 32 and extending therefrom. The support plate 44 forms a sleeve 46 for securing the cover 26 to the hinge joint 30, as will be described subsequently. The sleeve 46 includes an expansion channel 48 disposed therealong for allowing the sleeve 46 to deform to permit objects to be disposed therein, as will be described with reference to FIG. 3.

Turning to FIG. 3, the cover 26 is shown along with a hinge joint 30. The hinge joint 30 is shown rotatably interconnecting a pivot arm 50 to the support member 28. The pivot arm 50 includes a first end 52 rotatably secured to the hinge joint 30 and second end 54, spaced from the hinge joint 30. The pivot arm 50 is capable of rotating about a pivot axis B, as indicated by the arrow of FIG. 3.

The cover 26 is shown in phantom disposed over the hinge joint 30 in an installed position. The cover 26 is installed over the pivot arm 50, hinge joint 30, and support member 28, by first rotating the pivot arm 50 about the pivot axis B to a "first position," wherein the pivot arm 50 is in line with the support member 28, as shown in FIG. 3. In other words, the arm 50 is rotated until it forms a relatively straight line with the support member 28. Once in the "first position," the second end 54 of the pivot arm 50 is inserted into the sleeve 46 and passed therethrough until the pivot arm 50 extends through the opposite side thereof, as shown in phantom in FIG. 3. The outer dimensions of the pivot arm 50 and support member 28 are roughly equal to the inner dimensions of the sleeve 46. However, do to the expansion slot 48 disposed along the sleeve 46, the sleeve 46 is capable of expanding or flexing outwardly to accommodate the pivot arm 50 and support member 28 as they are passed therethrough. In the installed position, the face plate 32 rest adjacent the hinge joint 30 and the sleeve 46 of the support plate 44 is tightly disposed about the support member 28. In this manner, the support plate 44 is secured to the support member 28 thereby preventing the face plate 32 from moving relative to the hinge joint 30.

With reference to FIG. 4, the cover 26 is shown installed about the hinge joint (hidden) and support member 28 (in phantom). The hinge joint is secured to the first end 52 of the pivot arm 50, best shown in FIG. 3, and the second end 54 of the pivot arm 50 is secured to the articulated member 21 of the middle unit 16, as will be described in more detail with reference to FIGS. 5 and 6. Rectangular shaped channels 56,56' are secured to the articulated member 21 for slidably receiving and guiding the strips 34,34'. More specifically, the channels 56,56' are located about the hinge joint and guide and maintain the strips 34,34' in a substantially circumferencial path about the hinge joint, as the pivot arm 50 is rotated, as will be explained with reference to FIGS. 5 and 6. Further, the channels 56, 56' include spaced apart channel walls for slidably receiving and guiding the distal end 40 of the flexible strips 34, 34'.

Figure 5:
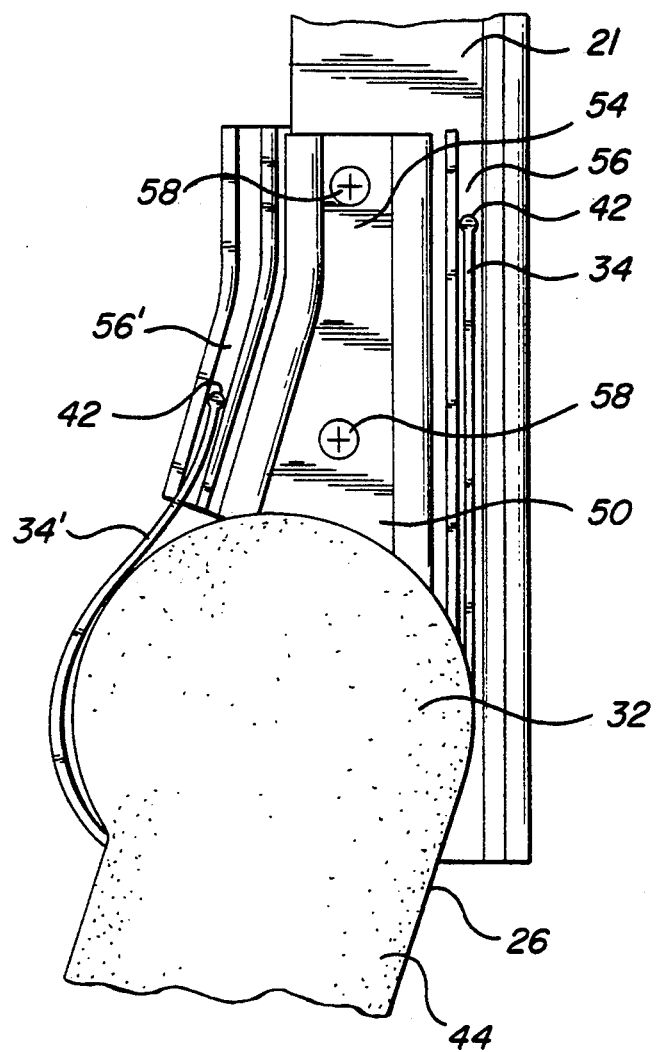
FIG. 5 is a side view of the hinge cover installed upon a hinge joint with the pivot arm in a first position and the strips disposed within the channels.
Figure 6:
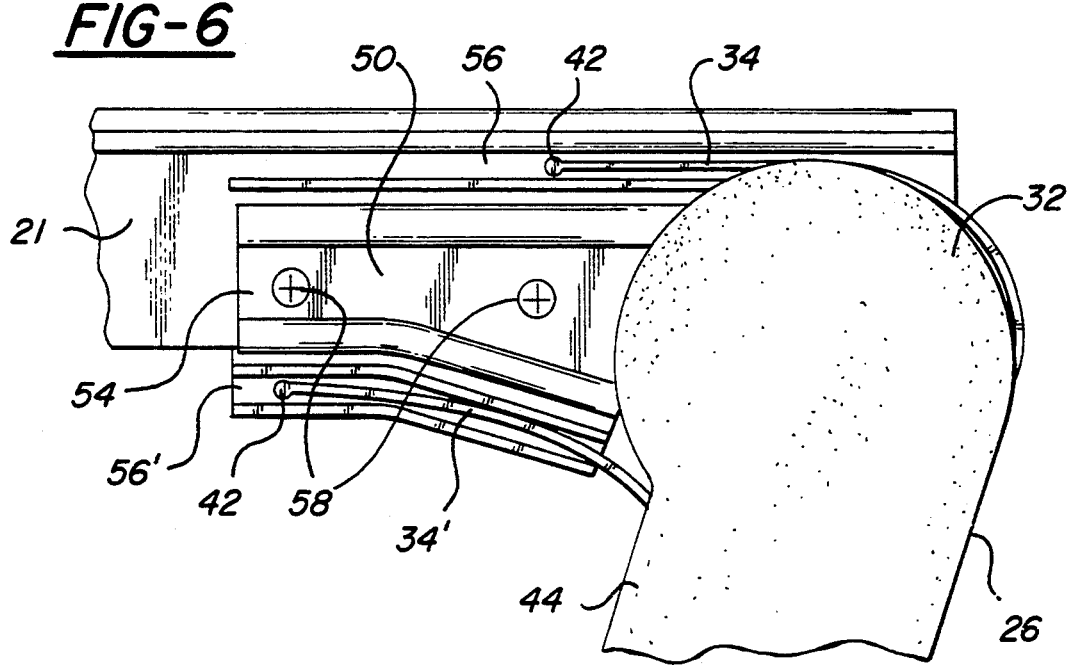
FIG. 6 is a side view substantially similar to FIG. 5 but showing the pivot arm rotated to a second position.

Turning to FIGS. 5 and 6, the cover 26 is shown in an installed position wherein the face plate 32 is disposed adjacent the hinge joint (hidden) and the support plate 44 is secured to and adjacent the support member (hidden). Preferably, the support plate 44 includes the sleeve 46 which is disposed about the support member 28, as described with reference to FIGS. 3 and 4. As also shown in FIG. 4, both FIGS. 5 and 6 disclose the hinge joint secured to the articulated member 21 of a seating or armrest assembly. More specifically, the second end 54 of the pivot arm is secured to the articulated member 21 by way of screws 58. Other fastening means may be used, or the second end 54 may be made integral with the articulated member 21. The articulated member 21 includes channels 56,56' for slidably receiving strips 34,34' respectively.

FIG. 5 illustrates the pivot arm 50 in the first position, wherein the pivot arm 50 is in line with the support member 28. In other words, the arm 50 is rotated until it forms a relatively straight line with the support member 28. As shown, the channels 56,56' guide the strips 34,34' about a portion of the circumference of the hinge joint. That is, the strips 34,34' are disposed about the circumference of the hinge joint and in the rotation path of the pivot arm 50. When in the first position, the strip numbered 34 is fully inserted within the channel 56, whereas the other strip, numbered 34', is only partially inserted within channel 56' with a portion of the strip 34' disposed about the circumference of the hinge joint. In this manner, the strip 34' prevents ingress of foreign materials into the hinge joint from about the circumference of the joint, i.e. from a radial direction. Moreover, the face plate 32 prevents ingress of foreign materials from the side of the hinge joint, i.e. from an axial direction. Finally, the support plate 44 protects and provides a decorative covering for a portion of the support member 28 adjacent the hinge joint.

With reference to FIG. 6, the pivot arm 50 is shown in a second position, substantially rotated from the first position so that the pivot arm forms approximately a 90 degree angle with the support member 28 (hidden) and support plate 44. In the second position, the strip numbered 34' is almost fully inserted within the channel 56', whereas the other strip, numbered 34, is only partially inserted within channel 56 with a portion of the strip 34 disposed about the circumference of the hinge joint. In this manner, the strip 34 prevents ingress of foreign materials into the hinge joint from about the circumference of the joint, i.e. from a radial direction.

Although only the first and second positions are shown in FIGS. 5 and 6, the pivot arm 50 is capable of a rotating through a plurality of intermediary positions, between the first and second positions. As will be appreciated, when in such intermediary positions, portions of both strips 34,34' will be disposed about the circumference of the hinge joint and within the channels 56,56', thus preventing ingress of foreign materials into the hinge joint as the pivot arm 50 is rotated between the first and second positions. The bulbous portions 42 disposed at the ends 40 of the strips 34,34' facilitate the sliding motion of the strips 34,34' along the channels 56,56'. More specifically, as the pivot arm 50 rotates, the strips 34,34' slide relative to the channels 56,56'. The bulbous portions 42 at the ends 40 of the strips 34,34' have an external dimension which roughly corresponds with the width and height of the channels 56,56', thus providing a close sliding fit therebetween.

It will be further appreciated that the relative length and positions of the strips 34,34' and channels 56,56' may altered so as to allow the pivot arm 50 to rotate between extreme positions other than the first and second positions shown in FIGS. 5 and 6. It should also be appreciated that the cover may be secured to the hinge joint in ways not specifically shown. For example, the cover may include a support plate which is attached to the pivot arm rather than the support member. In such an example, the channels would be secured to the support member, rather than the articulated member 21.

The subject cover is preferably fabricated from an organic polymeric material so as to permit flexibility and durability while remaining relatively inexpensive.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed:

1. A vehicular seating assembly (10) including a generally horizontal seat portion (18) secured to a generally upright backrest portion (20), said assembly (10) comprising:

an articulated member (21) defining at least a portion of said backrest (20);

a support member (28);

a hinge joint (30) pivotally interconnecting said articulated member (21) and said support member (28) and providing rotation of said articulated member (21) about a pivot axis (B) relative to said support member (28);

a cover (26) disposed about said hinge joint (30); and said assembly (10) characterized by said cover (26) including at least one flexible strip (34) longitudinally extending between a first end (36) connected to said cover (26) and a distal end (40) and spaced from said cover (26), said distal end (40) operatively engaged with one of said articulated member (21) and said support member (28) to flex said strip (34) circumferentially about said hinge joint (30) in response to said pivotal rotation of said articulated member (21) relative to said support member (28).

2. An assembly (10) as set forth in claim 1 further characterized by including at least one channel (56) having a pair of spaced apart channel walls; said distal end (40) of said strip (34) slidably received and guided between said walls of said channel (56) to flex said strip (34) circumferentially about said hinge joint (30) upon said pivotal rotation of said articulated member (21).

3. An assembly (10) as set forth in claim 2 further characterized by said channel (56) secured to said articulated member (21) adjacent said hinge joint (30).

4. An assembly (10) as set forth in claim 2 further characterized by said distal end (40) of said strip (34) including a bulbous portion (42) in sliding contact between said opposing walls of said channel (56).

5. An assembly (10) as set forth in claim 3 further characterized by said strip (34) having a substantially rectangular shape and said channel (56) having a corresponding rectangular shape.

6. An assembly (10) as set forth in claim 5 further characterized by including two flexible strips (34,34') and two corresponding channels (56,56').

7. An assembly (10) as set forth in claim 1 further characterized by said cover (26) including a face plate and a support plate (44) secured to and extending from said face plate (32) for securing said cover (26) to said assembly (10).

8. An assembly (10) as set forth in claim 7 further characterized by said support plate (44) including a sleeve (46) disposed about said support member (28) for securing said cover (26) to said support member (28).

* * * * *